United States Patent [19]
Anderson

[11] 3,770,261
[45] Nov. 6, 1973

[54] T-SLOT BOLT
[76] Inventor: Robert F. Anderson, 3613-13th St., Menominee, Mich. 49858
[22] Filed: Oct. 26, 1971
[21] Appl. No.: 192,176

Related U.S. Application Data
[63] Continuation-in-part of Ser. No. 77,980, Oct. 5, 1970.

[52] U.S. Cl.................... 269/47, 269/91, 269/93
[51] Int. Cl......... B23q 3/02, B23q 3/10, B25b 5/10
[58] Field of Search.................... 269/47, 91–94, 269/99–100, 223, 239, 245

[56] References Cited
UNITED STATES PATENTS

| | | | |
|---|---|---|---|
| 789,553 | 5/1905 | Lang | 269/93 |
| 1,033,758 | 7/1912 | Howell | 269/93 |
| 1,401,444 | 12/1921 | Roberts | 269/92 |
| 1,820,667 | 8/1931 | Leyes | 269/93 |
| 3,578,799 | 5/1971 | Davis | 269/52 |
| 3,565,416 | 2/1971 | Davis | 269/47 |
| 3,173,308 | 3/1965 | Wollenhaupt et al. | 269/92 X |
| 1,351,148 | 8/1920 | Alexander | 269/93 UX |
| 2,908,303 | 10/1959 | Schmidt | 269/91 UX |
| 2,350,585 | 6/1944 | Carpenter | 269/52 X |
| 2,520,249 | 8/1950 | Lapointe et al. | 269/48.1 |

FOREIGN PATENTS OR APPLICATIONS

| 134,649 | 11/1919 | Great Britain | 269/47 |
|---|---|---|---|

Primary Examiner—Othell M. Simpson
Assistant Examiner—Joseph T. Zatarga
Attorney—C. Kenneth Bjork

[57] ABSTRACT

The present invention is to a T-slot bolt for use with set-up and hold-down tools employed with planers, shapers, milling machines and the like machine assemblies having a conventional T-slot containing worktable and is of a configuration such that the T-head member can be slipped into a mating T-slot of the worktable anywhere along its length.

4 Claims, 4 Drawing Figures

PATENTED NOV 6 1973  3,770,261

INVENTOR.
Robert F. Anderson
BY
C. Kenneth Bjork
AGENT

T-SLOT BOLT

CROSS-REFERENCE TO RELATED APPLICATION

This application is a continuation-in-part to my application Ser. No. 77980, filed Oct. 5, 1970, for "Machine Tools."

BACKGROUND OF THE INVENTION

T-slot bolts are widely used in the machining industry to aid in setting up and holding in place work pieces on planers, shapers, milling machines and other similar machine tools having a mating T-slotted working surface or worktable.

The T-head of the bolt assures that the bolt does not turn in the T-slot of the table top during securing, holding or loosening operations. However, with conventional T-slot bolts, these must be slipped in from the end of the table. The problems associated with the use of conventional T-head nuts and T-head bolts have been set forth in detail in my parent application Ser. No. 77980, and are incorporated herein by reference.

GENERAL SUMMARY OF THE INVENTION

The T-slot bolt of the present invention has a stepped T-head portion so as to be held by the T-slot of a conventional slotted machine or worktable, but having one dimension such that the head can be slipped into a T-slot anywhere along its length without having to be slipped in from the end. The shank portion of the bolt extends above the surface of the table top such that it can readily be gripped by the fingers and freely moved along the slot.

The upper end portion of the bolt shank is fitted with threads designed to mate with a nut to hold a strap clamp or other clamp member securely in place when employed therewith to secure a work piece during a machining operation.

DESCRIPTION OF PREFERRED EMBODIMENTS

Figure 2:
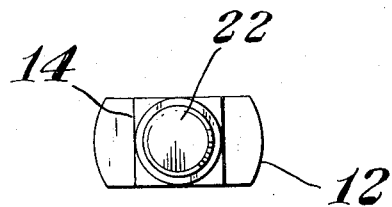
FIG. 2 is a vertical view, looking down from the bolt shank, of the T-slot bolt of FIG. 1.
Figure 1:
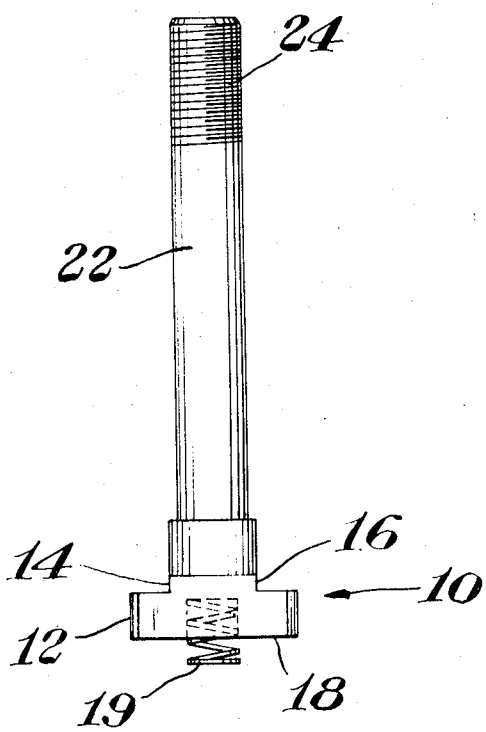
FIG. 1 is a side elevation of one preferred embodiment of the T-slot bolt of the present invention.

One embodiment of the T-slot bolts of the present invention as shown in FIGS. 1 and 2 consists of a T-head member 10. The bottom portion of the T-head 10 is a substantially rectangular stepped section 12 having a length sufficient such that in use it is held within a T-slot of a machine or table bed. It is of a width such that this section of the T-slot bolt can be slipped into a T-slot of the table anywhere along its length without having to be slipped in from the end.

The upper portion of section 12 consists of a vertical walled shoulder 14. The vertical walls 16 of shoulder 14 are indented a distance from the ends of section 12 such that when the T-bolt is positioned in a T-slot these slidably but snugly fit between the walls of such a slot in the expected manner of a T-head and T-slot assembly.

Figure 4:
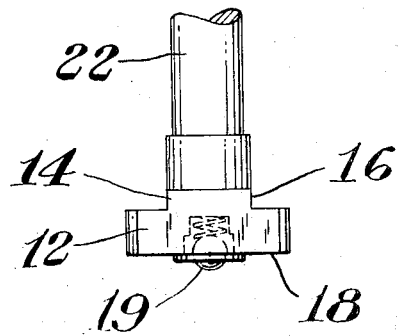
FIG. 4 is a fragmentary side elevation of another T-slot bolt of the present invention fitted with an alternative type of spring tension member.

The bottom surface 18 of section 12 is cut out and fitted, usually about at its midpoint, with a spring-tensioned member 19, usually a length of a coil spring, or a spring-tensioned pin, as shown in FIGS. 4. This member 19 is of a length such that when compressed as the T-head 10 is pushed into a T-slot it permits free rotation of the T-bolt within the slot below the walls of the slot. As the T-bolt is rotated in an arc of about 90° and the walls 16 become aligned with the walls of a T-slot, the pressure on the bolt is released thereby permitting the spring member 19 to exert tension on the T-head 10. This spring member 19 extends downwardly pushing the shoulder 14 of T-head 10 upwardly against the bottom of the T-slot whereupon the vertical walls 16 of shoulder 14 slide up between the walls of the T-slot and snugly fit therebetween thereby holding the T-bolt in a predetermined position in the slot and preventing it from turning within the slot.

Above shoulder 14, the T-bolt consists of an elongated shank 22, cylindrical in shape and of a height such that the top of this shank 22 extends above the upper surface of a T-slotted table top. This is fitted with a threaded portion 24 at its end which extends a predetermined distance down along the length of shank 22. These threads mate with a nut (not shown) or other securing or fastening member when used in a securing operation.

Figure 3:
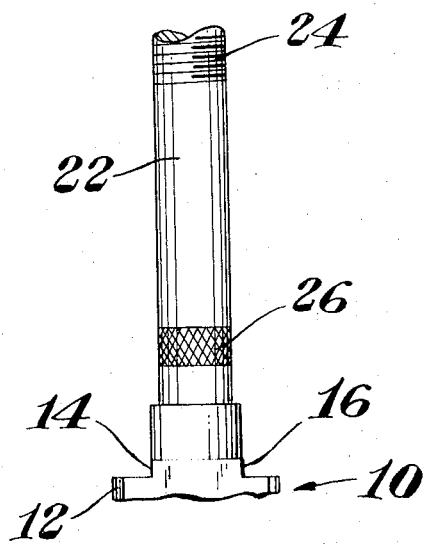
FIG. 3 is a fragmentary side elevation of an alternative shank configuration of the T-slot bolt of the present invention.

An alternative bolt shank 22 embodiment as depicted in FIG. 3 has a knurled, or otherwise roughened section or band 26, usually extending around its periphery intermediate the T-head 10 and the threaded portion 24. This roughened section 26 is not essential to the operation of the present T-slot bolt but merely makes it easier to grip the bolt firmly when positioning it in a T-slot of a worktable. Since this knurled portion 26 is specifically intended to provide a gripping surface, it is essential that if present, it must be above the surface of the worktable.

The T-slot bolt can be fabricated in a plurality of diameters and lengths as commonly employed with machine tools. Representative lengths of the shank portion of the bolt range from 1 to about 20 inches or more usually in one half or one inch increments with shank diameters of from about ¼ to about 1½ inch or more ordinarily of from about ⅜ to about 1 inch. The T-head 10 is of a maximum width to slip in a conventional T-slot in the table top of a planer, shaper, milling machine or other similar apparatus and of a length to fit within the slot when turned and placed in a working position therein.

The T-slot bolt can be forged from steel or otherwise fabricated from other ferrous based or high strength materials commonly employed with machine set-up and hold-down tools.

I claim:

1. A T-slot bolt for use with a T-slotted worktable which comprises:
    a T-head member, the bottom portion of said T-head member being a substantially rectangular stepped section mating with a T-slot of a T-slotted worktable, said stepped section having a length sufficient such that when positioned in said T-slot it is held therein but having a width such that said rectangular section can be slipped into said T-slot of said worktable anywhere along its length, the upper portion of said stepped section of said T-head member being a vertical walled shoulder indented a distance from its ends such that when said T-head member is positioned in said T-slot the vertical walls of said shoulder slidably but snugly fit between the walls of the T-slot, the bottom surface of said stepped section being fitted with a spring member, said spring member being of a length such that when compressed it permits free rotation of said T-head member within said T-slot below the walls of said T-slot and upon release, as the vertical walls of said shoulder are aligned with the walls of said T-slot, it pushes the shoulder of said T-head member upwardly against the bottom of said T-slot, the vertical walls of said shoulder being slid upwardly between the walls of said T-slot thereby holding said T-slot bolt in a predetermined position within said slot and preventing it from turning within said slot, an elongated shank above said shoulder, said shank being of a height such that the top of said shank extends above the upper surface of the T-slotted worktable, and the upper portion of said shank being fitted with threads.

2. The T-slot bolt as defined in claim 1 wherein said spring member is a coil spring.

3. The T-slot bolt is defined in claim 1 wherein said bolt shank contains a knurled section intermediate the T-head and the threaded portion.

4. The T-slot bolt as defined in claim 1 wherein said spring member is a spring pin.

* * * * *